United States Patent
Stehle et al.

(10) Patent No.: US 10,823,238 B2
(45) Date of Patent: Nov. 3, 2020

(54) TRANSMISSION CONTROL

(71) Applicant: ZF Friedrichshafen AG, Friedrichshafen (DE)

(72) Inventors: Harald Stehle, Tettnang (DE); Peter Schiele, Kressbronn (DE); Günther Maier, Meckenbeuren (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 170 days.

(21) Appl. No.: 16/250,159

(22) Filed: Jan. 17, 2019

(65) Prior Publication Data

US 2019/0219110 A1    Jul. 18, 2019

(30) Foreign Application Priority Data

Jan. 18, 2018   (DE) .................. 10 2018 200 779

(51) Int. Cl.
*F16D 48/06*    (2006.01)
*F16H 61/04*    (2006.01)
(Continued)

(52) U.S. Cl.
CPC ....... *F16D 48/062* (2013.01); *F16H 61/0204* (2013.01); *F16H 61/0403* (2013.01);
(Continued)

(58) Field of Classification Search
CPC .............. F16D 48/062; F16H 61/0204; F16H 61/0403; F16H 2500/1045; F16H 2500/30803; F16H 2500/30816; F16H 2500/30822; F16H 2500/30825; F16H 2500/3144; F16H 2500/50653; F16H 2500/70426; F16H 2500/7048; F16H 59/14; F16H 59/40; F16H 59/72; F16H 2200/0065; F16H 2200/2012;
(Continued)

(56) References Cited

U.S. PATENT DOCUMENTS 6,149,547 A    11/2000   Oba et al.
6,881,171 B2 *  4/2005   Kuhstrebe ............. F16D 48/062
                                                     477/78
(Continued)

FOREIGN PATENT DOCUMENTS

DE    19917575        * 10/2000
DE    19917575 A1    10/2000
(Continued)

OTHER PUBLICATIONS

DE1917575—Neumann, Oct. 26, 2000—Machine translation.*
(Continued)

*Primary Examiner* — Tinh Dang
(74) *Attorney, Agent, or Firm* — Dority & Manning, P.A.

(57) ABSTRACT

A method (200) for the open-loop control of a gearbox (100) that includes a first and a second proportionally controllable shift element (A-F) is provided. The method includes disengaging (215) the first shift element (A-F) according to a first control profile and engaging (220) the second shift element (A-F) of the gearbox (100) according to a second control profile. The first control profile includes a first variable portion which is determined as a function of a temperature of the gearbox (100).

9 Claims, 3 Drawing Sheets

(51) Int. Cl.
*F16H 61/02* (2006.01)
*F16H 61/686* (2006.01)
*B60W 50/00* (2006.01)
*F16H 59/72* (2006.01)
*F16H 59/14* (2006.01)
*F16H 3/66* (2006.01)
*F16H 59/40* (2006.01)
*F16H 59/42* (2006.01)

(52) U.S. Cl.
CPC ............ *F16D 2500/1045* (2013.01); *F16D 2500/30803* (2013.01); *F16D 2500/30816* (2013.01); *F16D 2500/30822* (2013.01); *F16D 2500/30825* (2013.01); *F16D 2500/3144* (2013.01); *F16D 2500/50653* (2013.01); *F16D 2500/7048* (2013.01); *F16D 2500/70426* (2013.01); *F16H 3/66* (2013.01); *F16H 59/14* (2013.01); *F16H 59/40* (2013.01); *F16H 59/42* (2013.01); *F16H 59/72* (2013.01); *F16H 61/686* (2013.01); *F16H 2059/148* (2013.01); *F16H 2200/0065* (2013.01); *F16H 2200/2012* (2013.01); *F16H 2200/2041* (2013.01); *F16H 2200/2046* (2013.01); *F16H 2200/2064* (2013.01); *F16H 2200/2094* (2013.01)

(58) Field of Classification Search
CPC ..... F16H 2200/2041; F16H 2200/2046; F16H 2200/2064; F16H 2200/2094; B60W 2050/0012

See application file for complete search history.

(56) References Cited

U.S. PATENT DOCUMENTS

| | | | |
|---|---|---|---|
| 8,868,307 | B2 | 10/2014 | Jeon |
| 2007/0167284 | A1 | 7/2007 | Steinhauser et al. |
| 2016/0047714 | A1* | 2/2016 | Fujii ................. F16D 48/06 73/115.04 |

FOREIGN PATENT DOCUMENTS

| | | |
|---|---|---|
| DE | 102006002122 A1 | 7/2007 |
| DE | 102011055926 A1 | 12/2012 |
| DE | 102012222366 A1 | 6/2014 |

OTHER PUBLICATIONS

German Search Report DE102018200779.9 dated Sep. 5, 2018. (10 pages).
German Search Report DE102018200776.4 dated Oct. 4, 2018. (10 pages).
German Search Report DE102018200777.2 dated Sep. 18, 2018. (10 pages).

* cited by examiner

TRANSMISSION CONTROL

FIELD OF THE INVENTION

The present invention relates generally to a transmission control. In particular, the present invention relates to the open-loop control of a gearbox for use in a motor vehicle.

BACKGROUND

A motor vehicle includes a drive train which includes a prime mover or drive source, a gearbox, and a driving wheel. Different gear ratios may be engaged in the gearbox in order to adapt a rotational speed of the prime mover to a rotational speed of the driving wheel. The gearbox includes multiple gear sets which may be differently configured and combined with the aid of shift elements. A control device controls the shift elements by way of an open-loop system and, in this way, determines which gear ratio is engaged, i.e., which step-down ratio (or step-up ratio) is present between an input side and an output side of the transmission, and determines with the aid of which gear sets in which configuration the step-down ratio is achieved. During a changeover from one gear ratio into another gear ratio, usually at least one shift element is disengaged and another shift element is engaged in order to achieve a changeover which is as smooth as possible.

One problem addressed by the invention is that of providing an improved technique for the changeover of a gear ratio engaged in a gearbox.

SUMMARY OF THE INVENTION

A method for the open-loop control of a gearbox that includes a first and a second proportionally controllable shift element is provided. The method includes disengaging the first shift element according to a first control profile and engaging the second shift element of the gearbox according to a second control profile. In this case, the first control profile includes a first variable portion which is determined as a function of a temperature of the gearbox.

In contrast to the prior art, in this way, the first shift element may be brought into a slip condition earlier within a gear change operation, and so the changeover of the engaged gear ratio may be carried out earlier, faster, or more comfortably. In particular, in interaction with a controlled powershift, which controls the disengagement time of the first shift element by way of an open-loop system, a decorrelation of the disengagement time from the disengagement speed may be achieved. The controlled powershift usually includes a static portion of the control profile, which is determined one time before the implementation or application of the control profile. The actuation of the controlled powershift may be delayed at a low temperature, while the disengagement time of the first shift element may be advanced. When the disengagement time of the first shift element in an unadapted gearbox is adjusted by way of the additional first portion, the controlled-powershift portion may be utilized exactly for adjusting a desired speed gradient during the gear ratio changeover.

The first variable portion may be additionally determined as a function of a torque to be transmitted by the gearbox. The determination may take place, in particular, with the aid of a characteristic map.

The first variable portion is preferably determined to be zero as soon as a slip occurs via the first shift element. The slip of the first shift element sets in when the synchronous speed of a gear ratio engaged in the gearbox at the beginning of the method is no longer maintained. If the slip present via the second shift element subsequently drops to zero, the synchronization point of the gear ratio to be engaged within the scope of the method has been reached.

The first control profile may include a second variable portion which is determined as a function of a torque to be transmitted by the gearbox and a predetermined speed ratio between an input shaft and an output shaft of the gearbox.

Moreover, the first control profile may include a third variable portion which is determined as a function of a total torque to be transmitted by the gearbox.

In addition, the first control profile may include a fourth variable portion which is determined as a function of a rotational speed of an output shaft of the gearbox.

A fifth variable portion of the first control profile may be determined as a function of a torque desired by a driver.

The first control profile may also include a sixth variable portion which is determined as a function of a controlled powershift.

A device for the open-loop control of a gearbox that includes a first and a second proportionally controllable shift element is also provided. The device includes the following: a first interface for connection to the first shift element; a second interface for connection to the second shift element; and a processing unit which is configured for disengaging the first shift element according to a first control profile and engaging the second shift element according to a second control profile. The first control profile includes a first variable portion, and the first variable portion is determined as a function of a temperature of the gearbox.

The device may be utilized for carrying out the method described herein. Advantages or features of the method may be transferred to the device, and vice versa.

BRIEF DESCRIPTION OF THE DRAWINGS

The invention will now be described more precisely with reference to the attached figures, in which.

DETAILED DESCRIPTION

Figure 1:
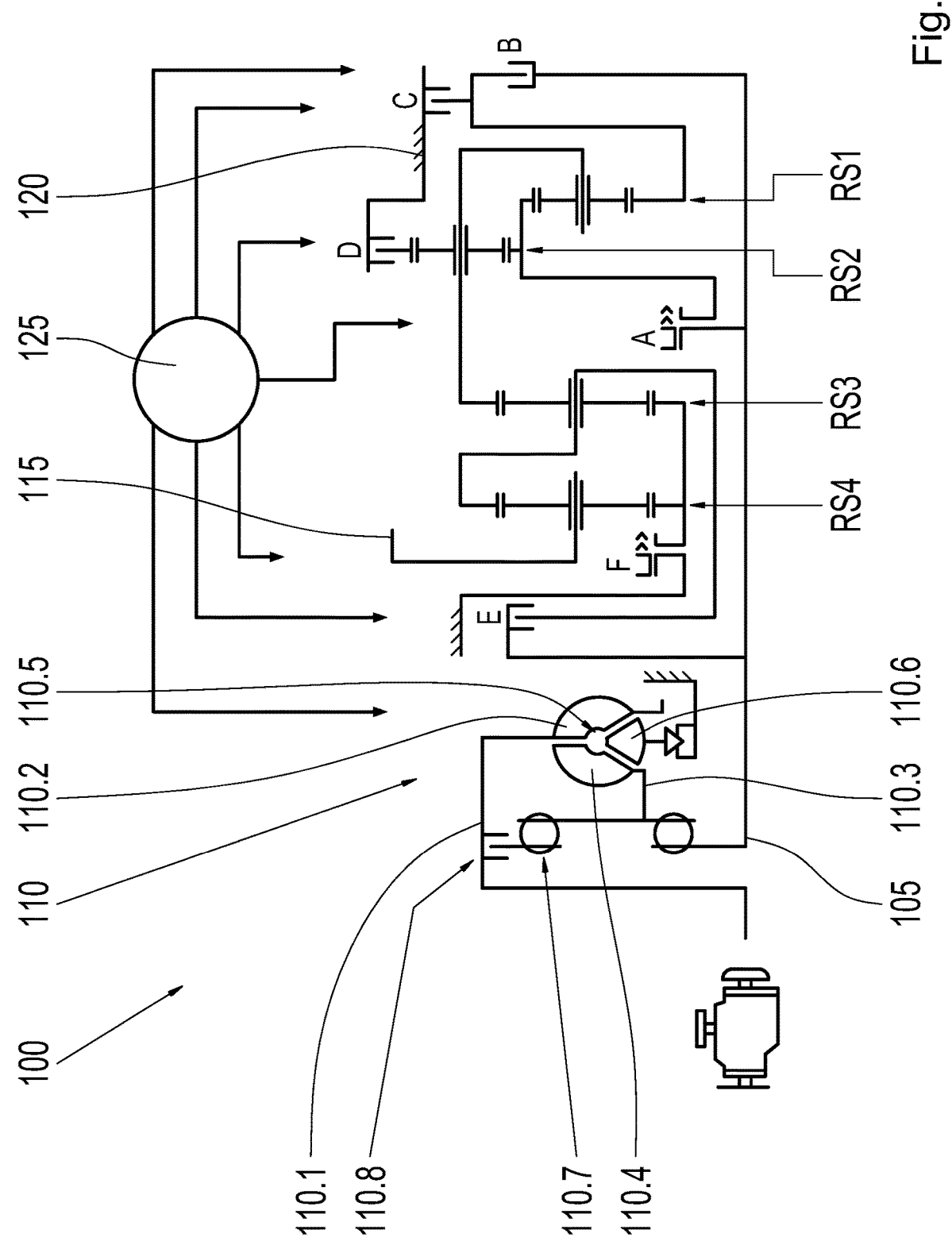
FIG. 1 shows a gearbox, for example, for use in a drive train of a motor vehicle.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a schematic of an exemplary gearbox 100 which is designed as a multi-stage planetary transmission. A changeover of a gear step or ratio engaged in the gearbox 100 is preferably hydraulically controllable. The present invention is described with reference to the represented gearbox 100, although the present invention may also be utilized on other types of transmissions which permit a controlled engagement or disengagement of a gear ratio.

The gearbox 100 is designed, by way of example, as a 9-speed transmission including one reverse gear and may preferably be utilized in a motor vehicle. The gearbox 100 includes four gear sets RS1 through RS4, each of which may be implemented as an epicyclic system, in particular, in the form of planetary gear trains. An input shaft 105 is configured for connection to a prime mover or drive source. Optionally, a hydrodynamic torque converter 110 is provided between the prime mover and the input shaft 105. The torque converter 110 may be designed to be integral with the gearbox 100 or may be encompassed by the gearbox 100. An output shaft 115 of the gearbox 100 is preferably configured for connection to a driving wheel of the motor vehicle in a torque-transmitting manner.

The hydrodynamic torque converter 110 includes an input side 110.1 which drives a pump 110.2, and an output side 110.3 which is driven by a turbine 110.4. The coupling takes place with the aid of a fluid 110.5 which flows between the pump 110.2 and the turbine 110.4. Preferably, a stator 110.6 is provided in order to direct and, if necessary, control the fluid flow. The torque converter 110 is provided, in particular, as a launch clutch and may bring about an increase in torque depending on a slip between the input side 110.1 and the output side 110.3. A vibration damper 110.7 may be connected to the output side 110.3 in order to reduce torsional vibrations in the torque path. The vibration damper 110.7 may also be provided when the torque converter 110 is dispensed with. Usually, a torque converter lockup clutch 110.8 is provided in order to set the rotational speed difference between the input side 110.1 and the output side 110.3 to zero and, in this way, to minimize flow losses in the torque converter 110, in particular at higher rotational speeds, i.e., after a starting operation.

The gear sets RS1 through RS4 are interconnected in the manner shown, by way of example. Each gear set includes three elements which engage into one another with the aid of tooth systems. The radially innermost element is also referred to as the sun gear, the outermost element is referred to as the ring gear, and the element located therebetween is also referred to as the planet gear. The planet gear is mounted so as to be rotatable with respect to a planet gear carrier which, for its part, is mounted so as to be rotatable about the same axis of rotation as the sun gear and the ring gear. In the representation from FIG. 1, the axis of rotation (not represented) extends horizontally along the input shaft 105. Parts of the gear sets RS1 though RS4 located axially symmetrically below the axis of rotation, as well as their shafts, are not represented. If one of the elements sun gear, planet gear carrier, or ring gear is held, in particular, by way of being braked with respect to a transmission housing 120, the other two elements may be utilized for coupling and decoupling torque, wherein a predetermined step-up or step-down ratio is achieved.

For the open-loop control of a torque flow through the gear sets RS1 through RS4, a total of six shift elements A through F are available in the represented embodiment, each of which may be activated to be disengaged or engaged. The shift elements C and D each operate between a rotary element and the transmission housing 120 and are also referred to as brakes. The shift elements A, B, E and F each operate between two rotary elements and are also referred to as clutches. At least one of the shift elements A through F is preferably configured for being capable of disconnecting or connecting, in a proportionally controllable manner, a torque connection between a completely disengaged position and a completely engaged position. For this purpose, friction elements may be provided, which are pressed axially against one another in order to establish a variable frictional connection. An axial contact force may be brought about, in particular, hydraulically, for the purpose of which, for example, an electronic pressure regulator may adjust a hydraulic control pressure according to a control signal in order to control the level of the torque transmission.

In the present embodiment, at least the shift elements B through E are proportionally controllable in terms of their transmission behavior. The shift elements A and F, in particular, may be designed as form-fit shift elements which can only be completely disengaged or completely engaged. The following table shows an exemplary shift pattern. For each gear step, shift elements A through F which are engaged in order to engage the gear step are marked with a dot. The other shift elements A through F are disengaged.

| Gear step | C | D | B | E | F | A |
|---|---|---|---|---|---|---|
| 1 |   | • |   |   | • | • |
| 2 | • |   |   |   | • | • |
| 3 |   |   |   | • | • | • |
| 4 |   |   | • | • | • |   |
| 5 |   |   |   | • | • | • |
| 6 | • |   |   | • |   | • |
| 7 |   | • |   | • |   | • |
| 8 | • | • |   | • |   |   |
| 9 |   | • | • | • |   |   |
| R |   | • | • |   | • |   |

A changeover from an engaged gear step to another gear step requires the disengagement of at least one engaged shift element A through F and the engagement of at least one disengaged shift element A through F.

If, for example, the second gear step is engaged in the gearbox, torque is transmitted from the input shaft 105 via the shift element A to the ring gear of the first gear set RS1. The sun gear of the first gear set RS1 is connected to the housing 120 via the shift element C. The shift element D is disengaged, and so the second gear set RS2 transmits no torque. The torque made available by the first gear set RS1 at the planet gear carrier of the first gear set RS1 is transmitted to the ring gear of the third gear set RS3. Sun gears of the third gear set RS3 and of the fourth gear set RS4 are connected to the housing 120 via the shift element F. Torque is coupled from the planet gear carrier of the third gear set RS3 into the ring gear of the fourth gear set RS4. The output shaft 115 is driven by the planet gear carrier of the fourth gear set RS4.

In order to now engage the third gear step, the shift element B is engaged and the shift element A is disengaged. The functions of the gear sets RS2 through RS4 remain unchanged. As in the second gear step, the first gear set RS1 is driven via the ring gear and torque is made available via the planet gear carrier. The sun gear is now connected via the shift elements A and B to the ring gear, however, and so the step-down ratio of the first gear set RS1 is set to one.

In order to ensure a high level of shifting comfort or a high shifting speed, the condition changes at the shift elements A through F must be more precisely matched to one another. During a gear step changeover, two gear steps are usually intermittently simultaneously engaged and transmit torque, wherein at least one of the shift elements A through F is in the slip condition.

A control device 125 is configured for appropriately disengaging and engaging the shift elements A through F and, in this way, engaging a desired gear step in the gearbox 100. The shift elements A through F are usually hydraulically actuated, wherein a disengagement or engagement force and a disengagement or engagement position of a shift element A through F depend on an applied hydraulic pressure. An electronic pressure regulator is usually assigned to each shift element A through F for the open-loop control of the hydraulic pressure. A pressure regulator converts a predefined, usually electrical signal into a corresponding hydraulic pressure and may operate in the manner of a proportional valve, a control valve, or servo-valve. The control device 125 operates preferably electrically and may include a programmable microcomputer or microcontroller. A signal made available at an electronic pressure regulator may be present as a pulse-width modulated (PWM) signal.

The control device 125 determines control signals to be set for the shift elements A through F usually with respect to an event, the time, or a transmission parameter which may be sampled with the aid of a suitable sensor. Transmission parameters may include, for example, rotational speeds at different points of the gearbox 100, a hydraulic pressure, a torque to be made available or to be transmitted, a temperature, or a position of a shift element A through F. An event may be derived from one sampled parameter or from a combination of multiple sampled parameters. For example, it may be determined that a synchronization point is no longer met when a slip sets in at a shift element A through F and the friction elements have different rotational speeds. The fact that the synchronization point is no longer met may also be determined on the basis of a ratio of rotational speeds of the input shaft 105 with respect to the output shaft 110. If the ratio does not match a predetermined reduction ratio of a gear step, the synchronization point of this gear step is not met. An event may also be determined with reference to an external parameter, for example, when a signal regarding a changed driver demand, a changed operation of the prime mover, or a change in the drive train between the output shaft 115 and a driving wheel is acquired.

The processing unit 125 may predefine the hydraulic control pressure to be set for a shift element A through F in the form of a curve over time, which is also referred to as a control profile or gradient. For a predetermined sequence in the gearbox 100, for example, the changeover from the third gear step into the second gear step, multiple profiles, which are matched to each other, for the shift elements A through F are usually determined and made available. A changeover of the gear step may require a time of approximately a quarter (¼) second or less. Under certain circumstances, however, a changeover of the gear step may be extended for a longer time. A control profile may be composed of multiple portions which may be additively combined with one another. A portion may be static, in part or completely, when the control profile is dependent only on time and not on an event or a parameter. A portion may also be dynamic when there is a dependency on an event or a parameter. In this case, the control profile may be determined or changed while the control profile is already being utilized for the open-loop control of a shift element A through F. For example, a first portion may ensure the desired functionality in the first approximation, a second portion may represent a refinement, such as an increase in comfort, and a third portion may implement a further optimization in a special case, for example, during downshifting accompanied by a brake application at a driving wheel.

In order to assist the changeover of the engaged gear step, a demand to limit the torque provided by the prime mover to a predetermined value may also be transmitted to the prime mover connected to the input shaft 105.

Figure 2:
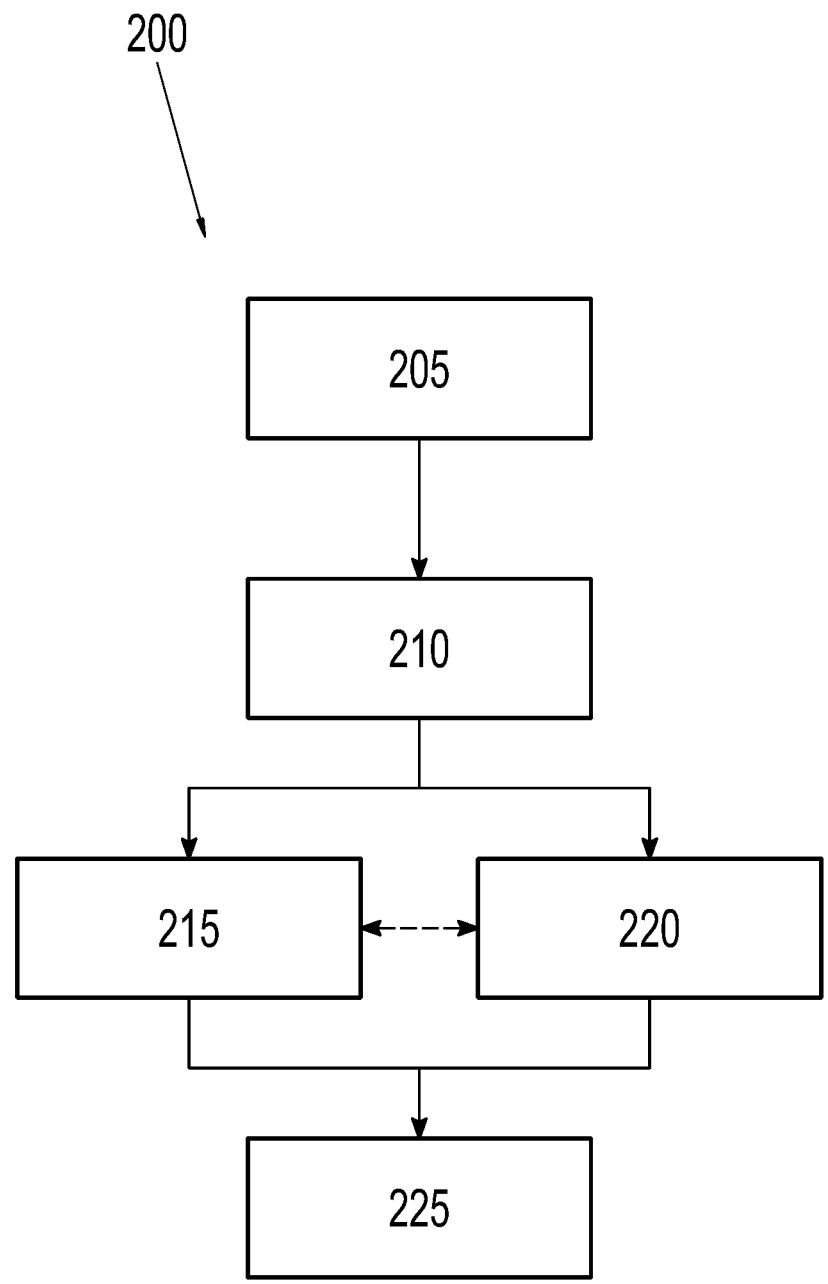
FIG. 2 shows a flow chart of a method for the open-loop control of a gearbox.

FIG. 2 shows a flow chart of a method 200 for the open-loop control of a gearbox 100. The method 200 is configured, in particular, for execution on the control device 125 and may be present as a computer program product including program code for the open-loop control of the gearbox 100.

The method 200 begins at 205. In response to a predetermined event, a changeover of a gear step engaged in the gearbox 100 is demanded. At 210, shift elements A through F involved in the changeover, and respective associated pressure regulators, may be determined. Usually, only one shift element A through F is disengaged and only one other shift element A through F is engaged. Multiple shift elements A through F may also be involved in the gear step changeover, however.

Thereafter, at 215, a first control profile for a shift element A through F to be disengaged is determined and the shift element A through F is activated according to the determined first control profile. Multiple time-dependent portions may be determined in this case, which may be additively combined to form the first profile. Usually, at least one of the portions is dependent on at least one parameter or event during 215, and so the first control profile may be determined or changed during the activation of the shift element A through F. Correspondingly, at 220, a second control profile for a shift element A through F to be engaged is determined and the shift element A through F is activated according to the determined second control profile. 215 and 220 may influence one another, for example, in that an event, which is triggered by the disengagement of a shift element A through F in 220, changes the determination of the first profile in 215.

As soon as the control profiles have been completely determined and activated, and so the predetermined shift elements A through F have been completely disengaged or engaged, the gear step changeover is concluded and the method 200 may terminate at 225.

Figure 3:
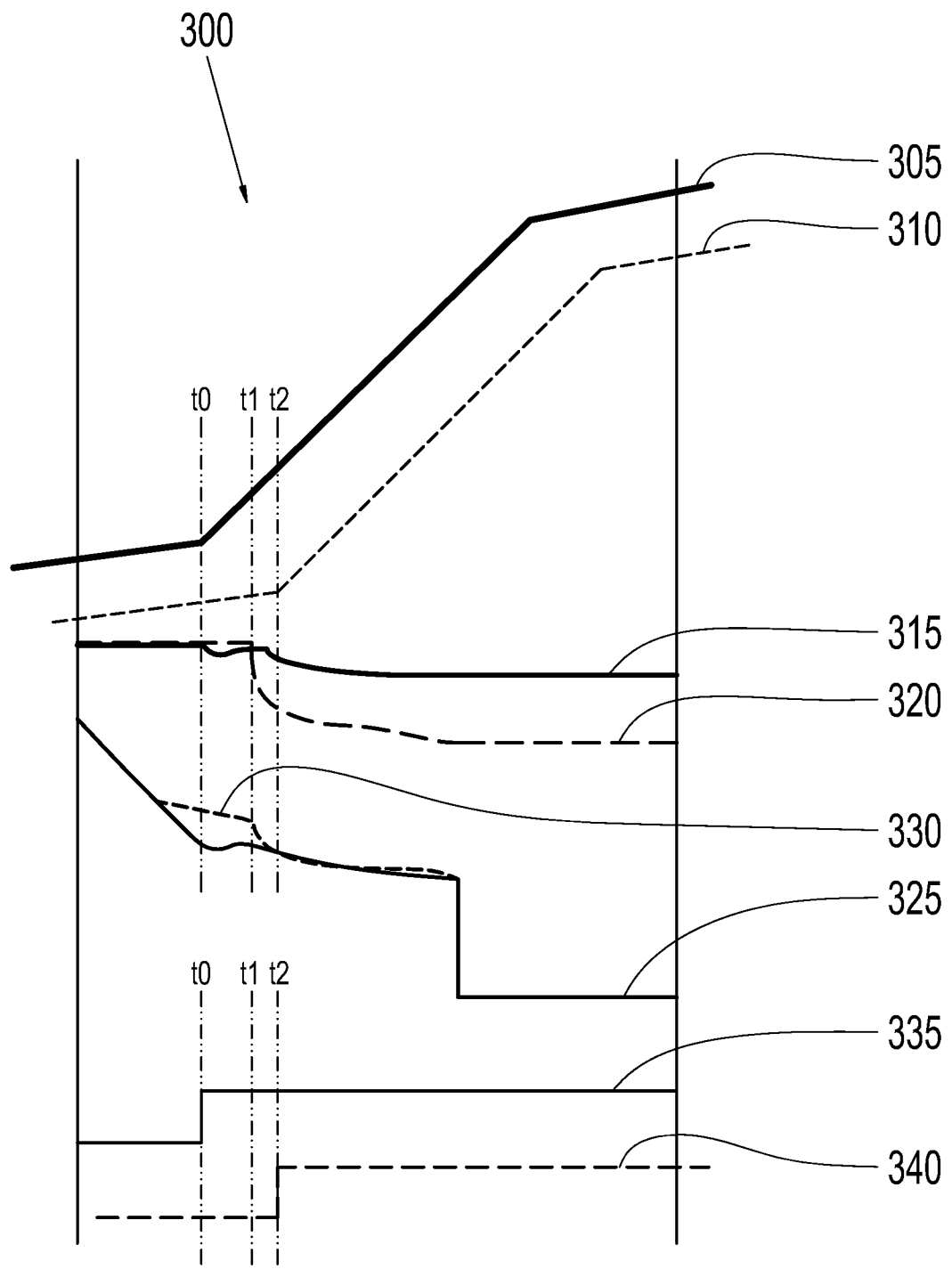
FIG. 3 shows exemplary profiles with respect to a gearbox during a changeover of an engaged gear step.

FIG. 3 shows exemplary profiles with respect to a gearbox 100 during a changeover of an engaged gear step. Represented therein are portions of a first control profile for a shift element A through F which is disengaged during the changeover, i.e., is responsible for the deactivation of a gear step engaged at the beginning of the changeover. A high value in this case corresponds to a high engagement force or a position of the shift element A through F engaging to a large extent, while a low value indicates a disengaged shift element A through F. A downshift under traction load, for example, from the third gear step into the second gear step, is shown in FIG. 3 purely by way of example.

Solid lines represent variables according to the technique provided herein. Dashed lines represent variables according to the prior art. Profiles 305 and 310 show the rotational speed of the input shaft 105 of the gearbox 100. Profiles 315 and 320 reflect a portion of a controlled powershift at the first control pressure. Profiles 325 and 330 show the first profile which may be composed of multiple portions. Profiles 335 and 340 relate to the event that a synchronous speed of a gear step engaged at the start of the changeover is no longer maintained. The represented profile assumes a high value when the event occurs or when the condition is assumed. The synchronous speed is considered to be no longer maintained when there is a slip via the shift element A through F controlled by way of open-loop control on the basis of the first control profile, i.e., rotational speeds of the elements of the shift element A through F differ from one another by more than a predetermined amount (in particular, zero).

The shift element A through F to be disengaged is activated with the aid of a control profile which may be composed of multiple portions.

A first portion (KF_POKABNGAB_xy) may be determined as a function of a temperature of the gearbox 100 or a fluid circulating therein, in particular, an oil. In addition, the torque present at the input shaft 105 may be taken into account. The determination of the first portion may take place with the aid of a characteristic map.

A second portion (KF_PKAByx) may be determined with the aid of a characteristic map on the basis of a torque present at the input shaft 105 and a rotational speed which the input shaft 105 assumes as a function of the rotational speed of the output shaft 115 when the gear step to be engaged is completely active (turbine synchronous speed).

A third portion (pgokab_sum) may be formed as the sum of other portions as a function of the torque present at the input shaft 105.

A fourth portion (KL_POKABNGAB_xy) may be formed as a function of the rotational speed of the output shaft 115, in particular with the aid of a characteristic map.

A fifth portion (KL_POKABMDMOTSOLL_xy) may be determined as an offset on the basis of a torque desired by a driver, for example, with the aid of one further characteristic map.

A sixth portion (p_gls) may be added during a shift pressure phase when a controlled powershift is active.

It is provided, during a single downshift from one gear step into another gear step during the shift pressure phase, to allow the first portion to flow into the determination of the control profile of the shift element A through F to be disengaged, provided the gear step to be disengaged has not yet been exited. The exiting of the gear step to be disengaged is indicated by the event 335. When the event occurs, the taking into account of the first portion may be terminated or the first portion may be determined to be zero.

In sequential shifts of nested downshifts, the first portion may remain unaccounted for or may be determined to be zero. A sequential shift does not have a holding pressure phase and also does not have a ramp to a shift pressure. In the case of a sequential shift, the control profile would therefore take effect already during the lowering of the hydraulic pressure of the prepared shift element A through F to be disengaged and result in the initially active gear step being roughly disengaged.

It is clear from the representation from FIG. 3 that, by taking the first portion of the synchronization point into account, the gear step engaged at the beginning of the changeover may be exited already at the point in time t0, rather than first being exited at the point in time t2 according to the prior art. The disengagement of the shift element A through F of the gear step to be disengaged may therefore take place earlier by the time (t2−t0), and so the gear step changeover may take place faster or with better synchronization in order to engage the new gear step. This time is dependent on the temperature of the gearbox 100 and reflects the fact that a shift element A through F does not yet disengage at a predetermined control pressure when the gearbox 100 is cold, even though it already disengages in the case of the same activation when a gearbox 100 is warm. The first portion may bring about a correction of the disengagement behavior of the disengaging shift element A through F even before the controlled powershift sets in.

Modifications and variations can be made to the embodiments illustrated or described herein without departing from the scope and spirit of the invention as set forth in the appended claims.

REFERENCE CHARACTERS 100 gearbox
105 input shaft
110 hydrodynamic torque converter
110.1 input side
110.2 pump
110.3 output side
110.4 turbine
110.5 fluid
110.6 stator
110.7 vibration damper
110.8 torque converter lockup clutch
115 output shaft
120 transmission housing
125 control device
A-F shift element
200 method
205 start
210 determine first and second shift elements
215 determine profile for disengaging the first shift element
220 determine profile for engaging the second shift element
225 end
305 rotational speed of input shaft
310 rotational speed of input shaft according to the prior art
315 controlled-powershift portion
320 controlled-powershift portion according to the prior art
325 control profile
330 control profile according to the prior art
335 event: synchronous speed of old gear no longer maintained
340 event: synchronous speed of old gear according to the prior art no longer maintained

The invention claimed is:

1. A method (200) for open-loop control of a gearbox (100) that includes a first proportionally controllable shift element (A-F) and a second proportionally controllable shift element (A-F), the method (200) comprising:
    disengaging (215) the first shift element (A-F) of the gearbox (100) according to a first control profile; and
    engaging (220) the second shift element (A-F) of the gearbox (100) according to a second control profile,
    wherein the first control profile comprises a first variable portion, and the first variable portion is determined as a function of a temperature of the gearbox (100).

2. The method (200) of claim 1, wherein the first variable portion is further determined as a function of a torque to be transmitted by the gearbox (100).

3. The method (200) of claim 1, wherein the first variable portion is determined to be zero as soon as a slip occurs via the first shift element (A-F).

4. The method (200) of claim 1, wherein the first control profile further comprises a second variable portion, and the second variable portion determined as a function of a torque to be transmitted by the gearbox (100) and a predetermined speed ratio between an input shaft and an output shaft of the gearbox (100).

5. The method (200) of claim 1, wherein the first control profile further comprises a third variable portion, and the third variable portion is determined as a function of a total torque to be transmitted by the gearbox (100).

6. The method (200) of claim 1, wherein the first control profile further comprises a fourth variable portion, and the fourth variable portion is determined as a function of a rotational speed of an output shaft of the gearbox (100).

7. The method (200) of claim 1, wherein the first control profile further comprises a fifth variable portion, and the fifth variable portion is determined as a function of a driver desired torque.

8. The method (200) of claim 1, wherein the first control profile further comprises a sixth variable portion, and the sixth variable portion is determined as a function of a controlled powershift.

9. A device (125) for open-loop control of a gearbox (100) that includes a first proportionally controllable shift element (A-F) and a second proportionally controllable shift element (A-F), the device (125) comprising:
- a first interface for connection to the first shift element (A-F);
- a second interface for connection to the second shift element (A-F);
- a processing unit (125); and
- a memory storing computer-executable instructions that, when executed by the processing unit (125), cause the processing unit (125) to perform operations comprising
  - disengaging the first shift element (A-F) according to a first control profile, and
  - engaging the second shift element (A-F) according to a second control profile,
  - wherein the first control profile comprises a first variable portion, and the first variable portion is determined as a function of a temperature of the gearbox (100).

\* \* \* \* \*